US009225651B2

(12) United States Patent
Wang et al.

(10) Patent No.: US 9,225,651 B2
(45) Date of Patent: Dec. 29, 2015

(54) METHOD AND APPARATUS FOR LOAD BALANCING

(75) Inventors: Jiandong Wang, Beijing (CN); Qiang Ma, Beijing (CN)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 142 days.

(21) Appl. No.: 14/130,881

(22) PCT Filed: Jul. 8, 2011

(86) PCT No.: PCT/CN2011/076985
§ 371 (c)(1),
(2), (4) Date: Jan. 3, 2014

(87) PCT Pub. No.: WO2013/007002
PCT Pub. Date: Jan. 17, 2013

(65) Prior Publication Data
US 2014/0126374 A1 May 8, 2014

(51) Int. Cl.
*H04L 12/803* (2013.01)
*H04L 29/08* (2006.01)
*H04L 29/06* (2006.01)

(52) U.S. Cl.
CPC .......... *H04L 47/125* (2013.01); *H04L 67/1004* (2013.01); *H04L 67/1029* (2013.01); *H04L 69/12* (2013.01)

(58) Field of Classification Search
None
See application file for complete search history.

(56) References Cited

U.S. PATENT DOCUMENTS

| 6,510,135 | B1 * | 1/2003 | Almulhem et al. | 370/229 |
|---|---|---|---|---|
| 7,382,782 | B1 | 6/2008 | Ferguson et al. | |
| 2006/0087968 | A1 | 4/2006 | Bowen, Jr. et al. | |
| 2006/0176894 | A1 | 8/2006 | Oh et al. | |
| 2008/0101233 | A1 * | 5/2008 | Shi et al. | 370/235 |
| 2010/0106866 | A1 * | 4/2010 | Aybay et al. | 710/29 |

(Continued)

FOREIGN PATENT DOCUMENTS

| CN | 101106526 | 1/2008 |
|---|---|---|
| CN | 101577705 | 11/2009 |
| CN | 101610209 | 12/2009 |

(Continued)

OTHER PUBLICATIONS

International Preliminary Report on Patentability, Application No. PCT/CN2011/076985, Jan. 14, 2014, 1 page.

(Continued)

*Primary Examiner* — Benjamin H Elliott, IV
(74) *Attorney, Agent, or Firm* — Nicholson De Vos Webster & Elliott LLP

(57) ABSTRACT

Embodiments of the present invention relate to method and apparatus for load balancing in scheduling traffic flows in networks. In one aspect, there is provided a method of load balancing for use in scheduling a traffic flow, comprising: selecting, based on a mapping entry, a first processing engine (PE) from a plurality of PEs as a target PE for a packet of the traffic flow, the mapping entry indicating an association between the packet and the first PE; determining whether load of the target PE exceeds a threshold; and in response to determining that the threshold is exceeded, updating the selection of the target PE based on a scheduling status of the traffic flow, the scheduling status indicating a dispatch of a previous packet of the traffic flow, such that the packet is dispatched to the same target PE as the previous packet. Corresponding apparatus is also provided.

20 Claims, 7 Drawing Sheets

(56) References Cited

U.S. PATENT DOCUMENTS

2010/0195647 A1* 8/2010 Wang et al. .................. 370/389
2014/0126374 A1* 5/2014 Wang et al. .................. 370/235

FOREIGN PATENT DOCUMENTS

| CN | 101741691 | 6/2010 |
|---|---|---|
| EP | 1 011 227 A2 | 6/2000 |
| EP | 1 940 109 A2 | 7/2008 |

OTHER PUBLICATIONS

Written Opinion of the International Searching Authority, Application No. PCT/CN2011/076985, Apr. 12, 2012, 4 pages.
Notification Concerning Transmittal of International Preliminary Report on Patentability, Application No. PCT/CN2011/076985, Jan. 23, 2014, 1 page.
International Search Report, Application No. PCT/CN2011/076985, Apr. 12, 2012, 3 pages.
Chen, Yijiao, et al., "MSF: A Session-Oriented Adaptive Load Balancing Algorithm", 2007 IFIP International Conference on Network and Parallel Computing—Workshops, 2007 IEEE, 7 pages.
Liu, Tingwen, et al., "Load Balancing for Flow-based Parallel Processing Systems in CMP Architecture", 2009, 7 pages.
Shi, Weiguang, et al., "Sequence Preserving Adaptive Load Balancers", ANCS'06, Dec. 3-5, 2006, San Jose, California, USA, 10 pages.
European Search Report from foreign counterpart European Patent Application No. 11869295, mailed Dec. 11, 2014, 5 pages.

* cited by examiner

METHOD AND APPARATUS FOR LOAD BALANCING

CROSS-REFERENCE TO RELATED APPLICATIONS

This application is a National stage of International Application No. PCT/CN2011/076985, filed Jul. 8, 2011, which are hereby incorporated by reference.

TECHNICAL FIELD

Embodiments of the present invention generally relate to the field of network communication, and more particularly, to method and apparatus for load balancing in scheduling traffic flows in networks.

BACKGROUND

The growth of backbone bandwidths from 10 Mbps to 10 Gbps has surpassed the growth of microprocessor performance in mainstream servers and computers. With the rapid growth of network bandwidth, the traffic load over a processing engine (PE) becomes much heavier, and a single PE can't sustain such high traffic load in general. As used herein, the term "processing engine" refers to any entity that is capable of processing traffic flows in the network.

One feasible solution for processing large amount of network traffic is to divide an overall traffic into several subsets of manageable size, thereby reducing the traffic load on a single PE. Parallel architecture has been developed for dispatching and processing packets of a network traffic flow. It will be appreciated that essential to such solution is the load balancing when scheduling traffic flow.

Referring to FIG. 1, a block diagram of high-level architecture for load balancing in scheduling a network traffic flow is illustrated. As shown, there is a load balancer 102 which is responsible for selecting, based on certain policies, a target PE for each packet in an incoming traffic flow. A packet scheduler 104 coupled to the load balancer 102 may be used to dispatch the packets to one of multiple available PEs in accordance with the selection made by the load balancer 102. It will be understood that the selection of target PE is of importance for the scheduling of traffic flows.

Effective load balancing is largely dependent on the policy for dispatching packets of traffic flows over multiple PEs. In general, a load balancing policy shall be as fair as possible. That is, the packets in a traffic flow shall be dispatched evenly, so as to avoid the situation where some PEs are heavily loaded while others are idle. Additionally, due to the varying natures of packets, the time and resource required to process individual packets may be different. Therefore, the dynamic capability or workload of each PE shall be taken into consideration when scheduling the traffic flows. Further, for many content oriented network applications, it is required that all the packets belonging to the same flow are dispatched to and processed by the same PE. Considering network security applications for example, many network activities hide their behavior feature so that the detection technology based on independent packet can't identify them. If all packets of a flow are not scheduled to an identical PE, the performance and accuracy may be reduced.

There have been several existing load balancing solutions. For example, round robin and randomization are typical examples of simple load balancing policies. However, such simple policies, which operate at packet level, cannot preserve packet order within individual flows, and cannot be used in content oriented applications. As an alternative, hash based solutions are widely used for load balancing in many network devices. Hash algorithms generally operate at flow level, and therefore could ensure that packets from a same flow are dispatched to an identical PE. Unfortunately, a hash algorithm alone is not able to balance workload when facing highly skewed flow size distributions in the network such as the Internet. Furthermore, performing load balancing by simply hashing the incoming packets does not consider the workload of each PE.

Another kind of load balancing solutions is on the basis of flow. In such solutions, each flow's scheduling status is recorded in a so-called flow table, such that the packets from a single flow can be dispatched to one PE. These solutions show a good performance in low bandwidth networks (no bigger than 100 Mbps). However, for high bandwidth networks (such as 10 Gbps) where there are millions of concurrent traffic flows, flow based solutions generally result in a very large flow table. A large flow table consumes not only lots of memory resources but also substantial searching time to determine which PE a packet shall be dispatched to when a new packet arrives.

In view of the foregoing problems, there is a need to provide an improved solution for load balancing in scheduling network traffic flows with respect to a plurality of PEs so as to overcome the above defects.

SUMMARY OF INVENTION

In one aspect, embodiments of the present invention provide a method of load balancing for use in scheduling a traffic flow. The method comprises: selecting, based on a mapping entry, a first processing engine (PE) from a plurality of PEs as a target PE for a packet of the traffic flow, the mapping entry indicating an association between the packet and the first PE; determining whether load of the target PE exceeds a threshold; and in response to determining that the threshold is exceeded, updating the selection of the target PE based on a scheduling status of the traffic flow, the scheduling status indicating a dispatch of a previous packet of the traffic flow, such that the packet is dispatched to the same target PE as the previous packet.

In another aspect, embodiments of the present invention provide a load balancer for use in scheduling a traffic flow. The load balancer comprises: engine selecting unit, configured to select a first processing engine (PE) from a plurality of PEs as a target PE for a packet of the traffic flow based on a mapping entry, the mapping entry indicating an association between the packet and the first PE; engine load determining unit, configured to determine whether load of the target PE exceeds a threshold; and engine selection updating unit, configured to update the selection of the target PE based on a scheduling status of the traffic flow in response to determining that the threshold is exceeded, the scheduling status indicating a dispatch of a previous packet of the traffic flow, such that the packet is dispatched to the same target PE as the previous packet.

In still another aspect, embodiments of the present invention provide a load balancer for use in scheduling a traffic flow. The load balancer comprises: at least one processor; and at least one memory storing program of computer executable instructions; the computer executable instructions configured, with the at least one processor, to cause the load balancer to at least perform according to the method described above.

Embodiments of the present invention provides an adaptive load balancing solution by combining the mapping based packet dispatching with dynamic recording of flow-specific scheduling status. The target PE for an incoming packet is initially selected according to mapping policy (e.g., via a PE distribution table). By monitoring the load or capacity of each PE, once a PE is found to be heavily loaded or busy, the successive flows may be redirected to another PE based on the flow-specific scheduling status (e.g., via a redirected flow table). In scheduling the traffic flows, the integrity of each traffic flow is maintained. In other words, packets from the same traffic flow will always be dispatched to a same PE.

Compared with those existing solutions, the redirected flow table only stores information on those traffic flows that need to be redirected, instead of all flows. In this way, the redirected flow table's size is reduced, thereby obtaining the efficient use of memory resources. Additionally, the proposed solutions are suitable to be implemented into hardware such as Field Programmable Gate Array (FPGA) or Application Specific Integrated Circuit (ASIC).

Other features and advantages of embodiments of the present invention will also be understood from the following description of specific embodiments when read in conjunction with the accompanying drawings, which illustrate, by way of example, the principles of embodiments of the invention.

BRIEF DESCRIPTION OF THE DRAWINGS

Embodiments of the invention are presented in the sense of examples and their advantages are explained in greater detail below, with reference to the accompanying drawings, wherein.

Throughout the figures, same or similar reference numbers indicates same or similar elements.

DETAILED DESCRIPTION

Embodiments of the present invention provide a method, apparatus, and computer program product for dynamic and adaptive load balancing. As further discussed below, in some embodiments, the packet dispatching based on mapping relationship and based on flow-specific scheduling status are combined. The scheduling status indicating a dispatch of a previous packet of the traffic flow. In this way, it is ensured that the packets from a single flow will be dispatched to the same target PE, while the workload or capacity of each PE can be taken into consideration. Now some exemplary embodiments of the present invention will be described below with reference to the figures.

Figure 1:
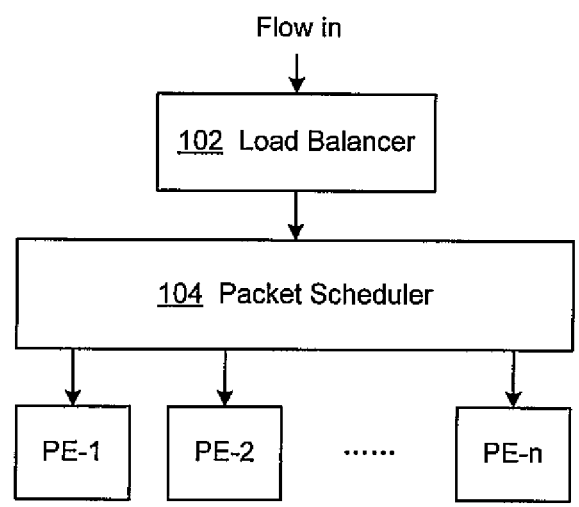
FIG. 1 is a block diagram of high-level architecture for balancing load in scheduling a traffic flow.

As described above, FIG. 1 shows a block diagram of high-level architecture for balancing load in scheduling a traffic flow is illustrated. The load balancer 102 may be responsible for selecting a target PE for each packet in an incoming traffic flow based on certain policies. Then the packet scheduler 104 may dispatch the packets according to the selection result from the load balancer 102. It can be seen that the selection of target PE by the load balancer plays an essential role in the scheduling of traffic flow. Next the method and apparatus for selecting the target PE for an incoming flow packet will be discussed in detail.

Figure 2:
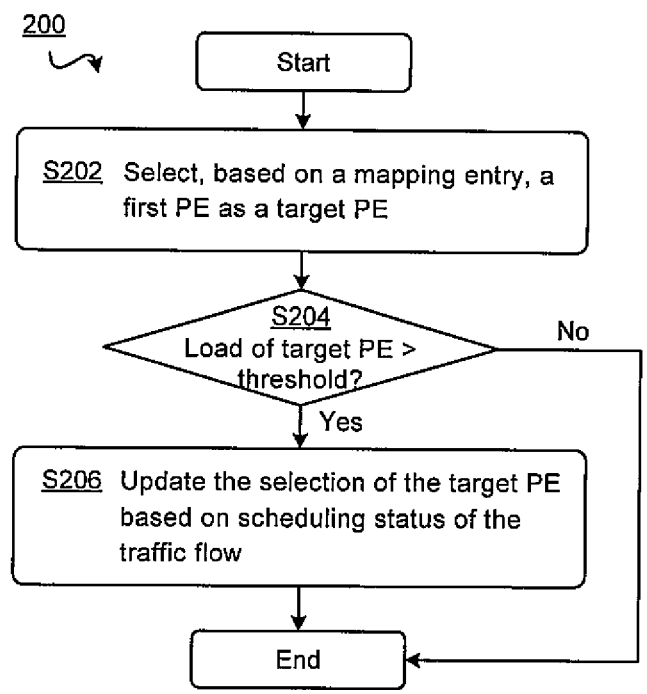
FIG. 2 is a flowchart illustrating a method of load balancing for use in scheduling a traffic flow in accordance with an exemplary embodiment of the present invention.

Referring to FIG. 2, a flowchart illustrating a method 200 of load balancing for use in scheduling a traffic flow in accordance with an exemplary embodiment of the present invention is shown. In accordance with embodiments of the present invention, method 200 may be carried out by, for example, the load balancer.

After method 200 starts, at step S202, a first PE is selected as a target PE for an incoming packet of the traffic flow based on a mapping entry. In accordance with embodiments of the present invention, a mapping entry may define the association between a packet and a specific PE. As an example, in some embodiments, the mapping entries may be implemented as a table, which can be referred as "PE distribution table" in the context of the present invention. In a PE distribution table, each entry (i.e., each row) may indicate one of a plurality of available PEs. The PE distribution table may be initialized in various ways. For example, the entries in the table may be filled with identifications of the PEs randomly or evenly. Additionally, the initialization of the PE distribution table may be performed automatically or manually.

When an incoming packet is received, the load balancer may retrieve an entry in the PE distribution table, and select the PE indicated by that entry as the target PE for the incoming packet. For an incoming packet, an entry in the PE distribution table may be retrieved in various ways. In some embodiments, the entry may be retrieved on the basis of a round robin or randomization policy. Alternatively, the entry in the PE distribution table may be retrieved based on the information related to the packet and/or the traffic flow.

In one embodiment, the mapping entry may be retrieved by using an index that is unique to the traffic flow. In other words, it is advantageous that all packets in a traffic flow share a common index and therefore correspond to an identical mapping entry. In this way, all packets belonging to one traffic flow can be dispatched to a single target PE. Further discussion in this regard will be presented below with reference to FIG. 3.

It is noted that the PE distribution table is just an illustrative example for the mapping entry as used in step S202. Any other suitable data structure or format can be used to embody the mapping entry as well. The scope of the present invention is not limited in this regard.

Returning to FIG. 2, method 200 then proceeds to step S204, where it is determined whether the load of the target PE selected at step S202 exceeds a threshold. In the context of the present invention, if the load of a PE exceeds a predefined threshold, then this PE is considered as being busy or heavily loaded. In practice, due to the potential different size of traffic flows and burstiness in the network, the load or processing capacity of each PE may be different after running for a period of time. Some PEs may become busy. In order to take the capacity of PEs into consideration, method 200 may check whether the selected target PE is already "busy."

In accordance with embodiments of the present invention, the determination at step S202 may be done in various ways. For example, in practice each PE is usually associated with one or more packet queues. Such packet queues may serve as buffers between the packet scheduler and the respective PEs. Accordingly, in some embodiments, the determination at step S204 may be done by comparing the length of the packet queue associated with the PE with at least one length threshold. The at least one threshold may be predefined and configurable. Alternatively or additionally, the determination at step S204 may be performed by monitoring the resource utilization on the PE. Any other suitable way for the comparison is possible as well, and the scope of the present invention is not limited in this regard.

It is noted that the monitoring of the target PE's load and the comparison with threshold may be performed at the load balancer, or alternatively, at an apparatus outside the load balancer. For example, in some embodiments, there may be a monitor separated from the load balancer which is responsible for monitoring the load of each PE, for example, by comparing the length of associated packet queue with the predetermined threshold.

If it is determined at step S204 that the load of the selected target PE is below the threshold, it means that the target PE is working normally. At this point, the selection at step S202 is valid, and the method 200 ends. Accordingly, the incoming packet will be dispatched to the first PE or a packet queue thereof. On the other hand, if it is determined at step S204 that the threshold is exceeded, it means that the target PE initially selected at step S202 is heavily loaded or in a busy state. In response, method 200 proceeds to step S206 where the selection of the target PE is updated based on a scheduling status of the traffic flow, such that the packet is dispatched to the same target PE as the previous packet of the traffic flow.

In accordance with embodiments of the present invention, the scheduling status of a traffic flow may indicate the dispatch of a previous packet of that traffic flow. The scheduling status is specific to individual traffic flow, and indicates whether any previous packet of the traffic flow in consideration has been dispatched to a PE and, if so, to which PE.

General speaking, at step S206, the load balancer will update the selection of target PE, such that the current incoming packet is dispatched to the same target PE as the previous packets of the traffic flow to which the current incoming packet belongs. Specifically, if it is determined that any previous packet of the current flow has been dispatched to the target PE (i.e., the first PE) initially selected at step S202, then the current incoming packet will also be dispatched to that target PE, even that PE is already heavily loaded at that time. In this way, while considering the capacity of PEs, it may be ensured that all the packets belonging to the same flow are dispatched to and processed by the same PE.

On the other hand, the current incoming packet is determined to be the first packet or start packet of a traffic flow, then a second PE other than the first PE will be selected as the target PE for the packet. At this point, the scheduling status will be created for the current traffic flow to record the dispatch of the current incoming packet. As such, when a successive packet of this traffic flow arrives, it can be dispatched to this second PE as well based on the created scheduling status. Further discussions in this regard will be presented below with reference to FIG. 3.

It will be appreciated that according to embodiments of the present invention, instead of recording the scheduling status for all incoming traffic flows as in the prior art, the scheduling status is only created for those traffic flows that need to be redirected. That is, only if the balancer determines that the target PE initially selected for an incoming packet is already busy, and therefore the traffic flow to which the incoming packet belongs needs to be redirected to another PE, then a scheduling status may be created for that traffic flow. As such, the storage resource and searching time associated with the scheduling status can be reduced compared with the existing solutions, especially for high bandwidth networks where there are millions of concurrent traffic flows.

In some embodiments, for example, the scheduling status of a traffic flow may be implemented as a table. Since the scheduling status is merely created for those redirected traffic flows as described above, such table may be referred as "redirected flow table" in the context of the present invention. In these embodiments, the redirected flow table is empty at the beginning. After a period of time, whenever there is a traffic flow needs to be redirected, an entry may be created in the redirected flow table. Each entry in the redirected flow table may define an association between a traffic flow and its target PE. Further discussion will be presented below with reference to FIG. 3.

It is noted that the redirected flow table is just an illustrative example of the scheduling status. Any other suitable ways for implementing the scheduling status of the traffic flow is possible as well. The scope of the present invention is not limited in this regard.

Figure 3:
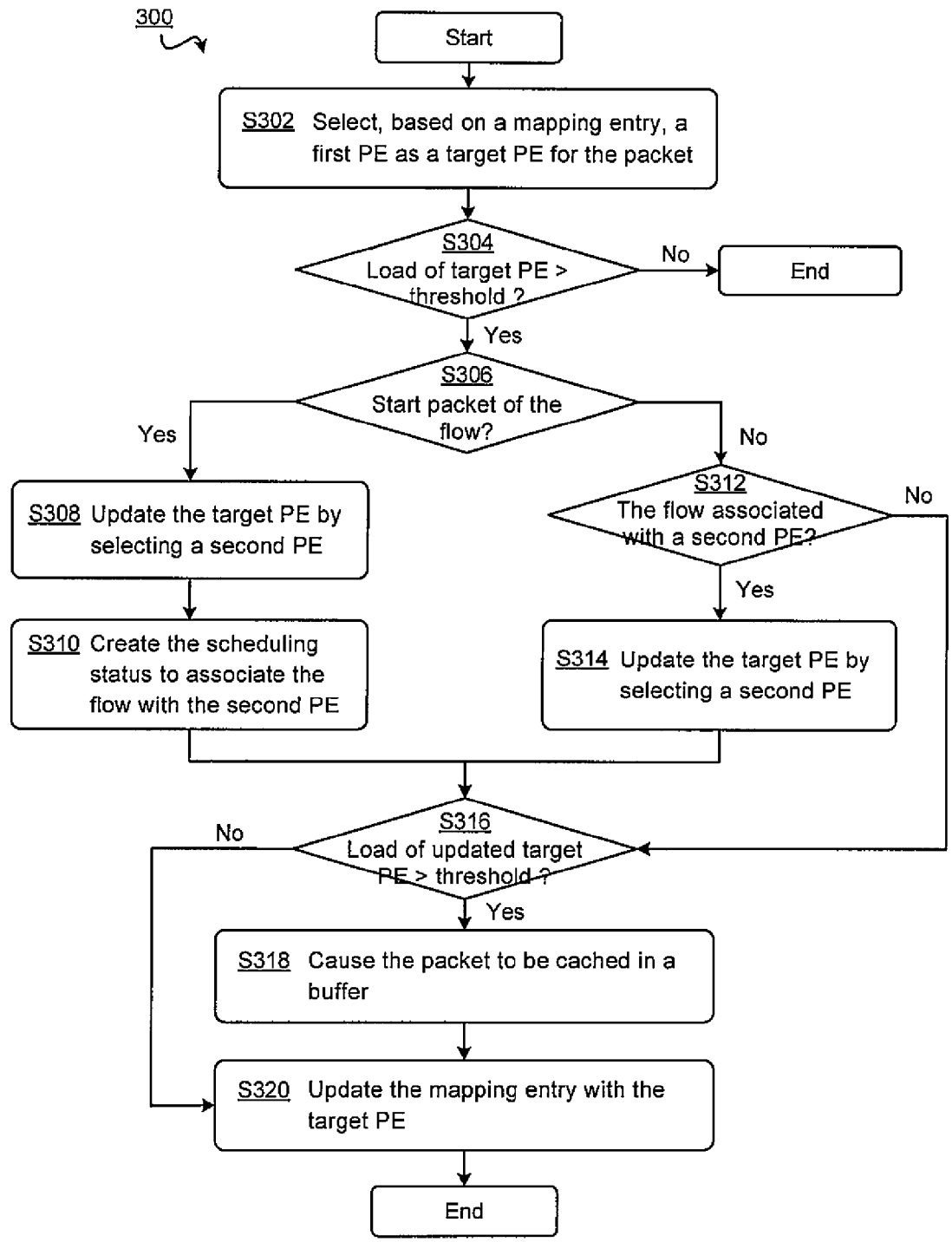
FIG. 3 is a flowchart illustrating a method of load balancing for use in scheduling a traffic flow in accordance with another exemplary embodiment of the present invention.

Now referring to FIG. 3, a flowchart illustrating a method 300 of load balancing for use in scheduling a traffic flow in accordance with another exemplary embodiment of the present invention is shown. Method 300 may be considered as an embodiment of method 200 described above with reference to FIG. 2. In the following description of method 300, the mapping entries for selecting the initial target PE are implemented by a PE distribution table, and the scheduling statuses of traffic flows are implemented by a redirected flow table. However, it is noted that this is only for the purpose of illustrating the principles of the present invention, rather than limiting the scope thereof.

After method 300 starts, at step S302, a first PE is selected as a target PE for an incoming packet of the traffic flow based on a mapping entry. In embodiments of method 300, the mapping entries may be contained in a PE distribution table. In the PE distribution table, each entry (e.g., each row) may indicate one of a plurality of available PEs. When an incoming packet is received, an entry in the PE distribution table is retrieved, and the PE indicated by that entry is selected as the target PE for the incoming packet.

In some embodiments, the mapping entry may be retrieved based on the information related to the packet and/or the traffic flow. For example, hash algorithm may be applied on the information extracted from the received packet, in order to derive one or more hash values. Then the hash value(s) may be used to calculate an index to retrieve a specific entry in the PE distribution table. Preferably, as described above, the index used for retrieving the mapping entry shall be unique to the traffic flow. That is, it is advantageous that all packets belonging to a single traffic flow share a common, index and, therefore correspond to an identical mapping entry. As such, all packets from the traffic flow can be dispatched to an identical target PE.

To this end, in some preferred embodiments, after an incoming packet arrives, at least the source address, the destination address, the protocol, the source port, and the destination port of packet may be extracted. Then hash algorithms, such as Cyclic Redundancy Check (CRC) 16 and/or CRC 32, may be employed on the extracted information to derive one or more hash values. As known, a traffic flow in the network may be uniquely characterized by a source address, a destination address, a protocol, a source port, and a destination port of its packets. Therefore, the derived hash value will be unique to the current traffic flow, that is, be equal for all packets from this flow.

Then the index for the PE distribution table may be calculated based on the derived hash value(s). For example, in some embodiments, the index may be calculated by applying modulo operator (%) on the hash value with the size of PE distribution table. Particularly, assume the size of the PE distribution table being M and the hash value is denoted as G, the index may be calculated as (G % M). In this way, the derived hash value is projected to the range of the size of the PE distribution table. Since packets from the same flow will have the same extracted information and therefore the same hash value, the index for the PE distribution table will be the same. Accordingly, the same target PE will be selected for packets from the same traffic flow.

It is noted that calculating the index based on the hash value and the specific hash algorithms (e.g., CRC 16 or CRC 32) as described above are merely intended to be exemplary, rather than limiting the scope of the present invention.

Next, method 300 proceeds to step S304, where it is determined whether the load of the target PE selected at step S302 exceeds a threshold. Step S304 in method 300 corresponds to step S204 in method 200 as described above. Similar with step S204, the determination at step S304 may be done by comparing the length of the packet queue associated with the PE with at least one length threshold. Such comparison may be performed by the load balancer, or by a monitor (e.g., a queue monitor) separated from the load balancer, for example. In the latter case, the load balancer may access the monitor (for example, periodically) to fetch the comparison results for the PEs. Alternatively, once the monitor determines that the load of a PE exceeds the predefined threshold, it may generate an interrupt to inform the load balancer that the PE is busy.

In accordance with embodiments of the present invention, the determination at step S304 may be performed on-the-fly. In particular, once an entry in the PE distribution table is retrieved for an incoming packet, the load balancer may determine whether the load of the associated PE exceeds the predefined threshold. Alternatively, in other embodiments, each entry in the PE distribution table may contain a "redirection" field to indicate whether the associated PE is busy and therefore the packet assigned to this entry needs to be redirected. In such embodiments, when the load of a PE is determined to exceed the threshold, the "redirection" fields of entries associated with that PE in the PE distribution table may be set accordingly. Then at step S304, the determination may be done by directly reading the "redirection" field of the retrieved entry.

Returning to FIG. 3, if it is determined at step S304 that the load of the selected target PE does not exceed the threshold, it means that the target PE is working normally. Accordingly, the selection at step S302 is valid, and the method 300 ends. Otherwise, if it is determined at step S304 that the threshold is exceeded, it means that the target PE initially selected at step S302 is already busy at that time, and therefore the selection of target PE needs to be updated. In response, method 300 proceeds to step S306 to determine whether the current packet is a start packet of a traffic flow.

In accordance with the embodiments of the present invention, the determination at step S306 may be done on the basis of information extracted from the incoming packet. As an example, for a traffic flow transmitted according to Transport Control Protocol/Internet Protocol (TCP/IP), the start packet of the flow contains a TCP flag "SYN." This TCP flag may be used to determine whether the current packet is the start packet of the flow. It is noted that this is merely an example, and any other suitable way is possible as well. The scope of the present invention is not limited in this regard.

In response to determining at step S306 that the current incoming packet is the start packet of flow, method 300 proceeds to step S308, so as to select a second PE that is different from the first PE as the new target PE. The initial selection of target PE is thus updated. In accordance with preferred embodiments of the present invention, at step S308, the second PE may be selected based on the loads of the plurality of available PEs. For example, the PE that has relatively low or minimum load pressure may be selected at S308. Alternatively, the second PE may be selected randomly from the PEs not being busy at that time. Other factors and criterions may also be considered in selecting the second PE. The scope of the present invention is not limited in this regard.

Specifically, as can be appreciated by a person skilled in the art, when the index for the PE distribution table is calculated based on a hash value as described above, it is possible that packets from different traffic flows are assigned to the same entry in the PE distribution table. In preferred embodiments of the present invention, at step S308, the same second PE is selected for those traffic flows that are assigned to the same entry in the PE distribution table. This is for the purpose of effective updating the PE distribution table as discussed below.

Next, at step S310, a scheduling status is created for the traffic flow to which the current incoming packet belongs to, in order to associate the traffic flow with the newly selected second PE. Specifically, as described above, the scheduling status may be implemented by a redirected flow table. In such embodiments, an entry may be created in the table to establish the association. After step S310, method 300 proceeds to an optional step S316 which will be discussed below.

In accordance with embodiments of the present invention, for example, when creating an entry in the redirected flow table at step S310, the index of the entry may be calculated in the following manner. Firstly, the source address, destination address, protocol, source port, and destination port (and possibly other information) of the incoming packet may be extracted. The two hash values may be calculated from the extracted information, for example, by applying CRC16 and CRC32 hash. Then, the index for the redirected flow table may be obtained based on the concatenation of the CRC16 and CRC32 hash values. In this way, different flows may have different indexes in the redirected flow table. Therefore, the index of an entry in the redirected flow table can be directly used as an identification of a traffic flow. It is noted that this is merely exemplary. An entry in the redirected flow table may contain any other suitable information that can be used to uniquely identify a traffic flow.

On the other hand, at step S306, if it is determined that the incoming packet is not the start packet of the traffic flow, then method 300 proceeds to step S312. At step S312, it is determined, based on the scheduling status, whether the traffic flow is associated with a second PE that is different from the first PE. In the embodiments where the scheduling status of the traffic flow are contained in the redirected flow table, the determination at step S312 can be done by checking whether there is an entry in the redirected flow table that is related to the current traffic flow. For example, as described above, the index for the redirected flow table may be calculated based on the concatenation of CRC16 and CRC32 hash values derived from the incoming packet's information. In such embodiments, the redirected flow table may be searched to check whether there is a non-empty entry with the calculated index.

If such an entry is located, then the determination can be made that the current flow has been associated with a second PE.

If it is determined at step S312 that the traffic flow is associated with the second PE, it indicates that at least one previous packet belonging to the current traffic flow has been dispatched to the second PE. Accordingly, the second PE is selected as the new target PE at step S314 in order to update the initial selection of the target PE. Then method 300 proceeds to step S316.

Otherwise, if it is determined at step S312 that the traffic flow is not associated with a different PE, it means that though the first PE as initially selected at step S302 is busy, at least one previous packet of the current traffic flow have been dispatched to this first PE. In this situation, method 300 proceeds to step S316 without altering the selection of target PE. The design philosophy behind this tradeoff is that the integrity of traffic flow shall be ensured regardless of the capacity of PEs.

At step S316, it is determined whether the load of the updated PE exceeds a threshold. It will be appreciated that the updated PE here may be the first PE (in case that the initial selection is not altered) or the second PE (in case that the initial selection is updated). The determination at step S316 can be done in a similar way with that at step S304. The thresholds used at steps S304 and S316 may or may not be different. In response to determining at step S316 that the threshold is exceeded, method 300 proceeds to step S318 where the incoming packet is caused to be cached in a buffer. Otherwise, method 300 proceeds to step S320.

The operations at steps S316 and S318 are performed to deal with the situation that an incoming packet has to be dispatched to a busy PE. In this case, In accordance with embodiments of the invention, there may be provided one or more additional buffers. When a packet is to be dispatched to a busy PE, it will be stored into the buffers. When the target PE is determined to be not heavily loaded after a while, the packets can be read out from the buffer and dispatched to the PE again. In some embodiments, the additional buffers may be shared by all the PEs, similar as a second level cache in CPU memory architecture. Alternatively, each PE may have its dedicated buffer(s). It will be appreciated that steps S316 and S318 are optional.

Next, at step S320, the mapping entry is updated with the updated target PE. In accordance with embodiments of the present invention, if the initial selection is not altered, then the mapping entry will not be changed as well. On the other hand, if the target PE is updated from the first PE to the second PE, then the mapping entry (for example, an entry in the PE distribution table) will be updated accordingly. As such, the successive packets assigned to this mapping entry will be dispatched to the second PE rather than the first PE directly based on the mapping entry.

In some embodiments, after running for a period of time, it can be assumed that all the flows associated with the mapping entry have ended. Hence, at step S320, upon escape of a predefined period of time, the mapping entry is updated with the updated target PE. For example, the second PE in the redirected flow table may be copied to the corresponding entry in the PE distribution table. In addition, if the entry in the PE distribution table has a "redirection" field as described above, then the "redirection" field of the updated entry may be set to indicate that no redirection is needed any more.

The assumption that after a period of time all the remaining flows affected by redirection have ended may not be true for long lived traffic flows. Therefore, in some alternative embodiments, each mapping entry is associated with a counter indicating the number of traffic flows being indexed or assigned to the mapping entry. In these embodiments, in response to determining that value of the counter is zero or below a threshold, the mapping entry is updated with the updated target PE.

If the mapping entry has been updated to that associated with the second PE, then after step S320, the successive packets indexed to the mapping entry may be dispatched directly based on the mapping entry to the second PE rather than the first PE, without making reference to the scheduling status of the flow (e.g., the redirected flow table). Therefore, in some embodiments, after the mapping entry is updated, the scheduling status of the relative traffic flows may be removed. For example, the relative entries in the redirected flow table may be deleted. In this way, the storage resource is released.

It is noted that the method 300 shown in FIG. 3 and described above is only for the purpose of illustrating principles of the present invention, rather than limiting the scope thereof. In fact, the method 300 is just a preferred embodiment of the method 200 shown in FIG. 2, and a person skilled in the art will readily envisage other possible embodiments.

Figure 4:
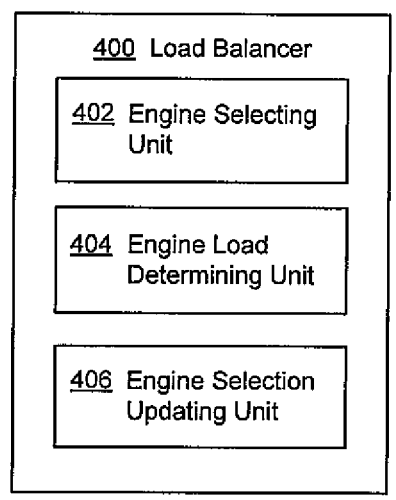
FIG. 4 is a block diagram of a load balancer for use in scheduling a traffic flow in accordance with an exemplary embodiment of the present invention.

Referring to FIG. 4, a block diagram of a load balancer 400 for use in scheduling a traffic flow in accordance with an exemplary embodiment of the present invention is shown. As shown, the load balancer 400 comprises: engine selecting unit 402, configured to select a first processing engine (PE) from a plurality of PEs as a target PE for a packet of the traffic flow based on a mapping entry, the mapping entry indicating an association between the packet and the first PE; engine load determining unit 404, configured to determine whether load of the target PE exceeds a threshold; and engine selection updating unit 406, configured to update the selection of the target PE based on a scheduling status of the traffic flow in response to determining that the threshold is exceeded, the scheduling status indicating a dispatch of a previous packet of the traffic flow, such that the packet is dispatched to the same target PE as the previous packet.

Figure 5:
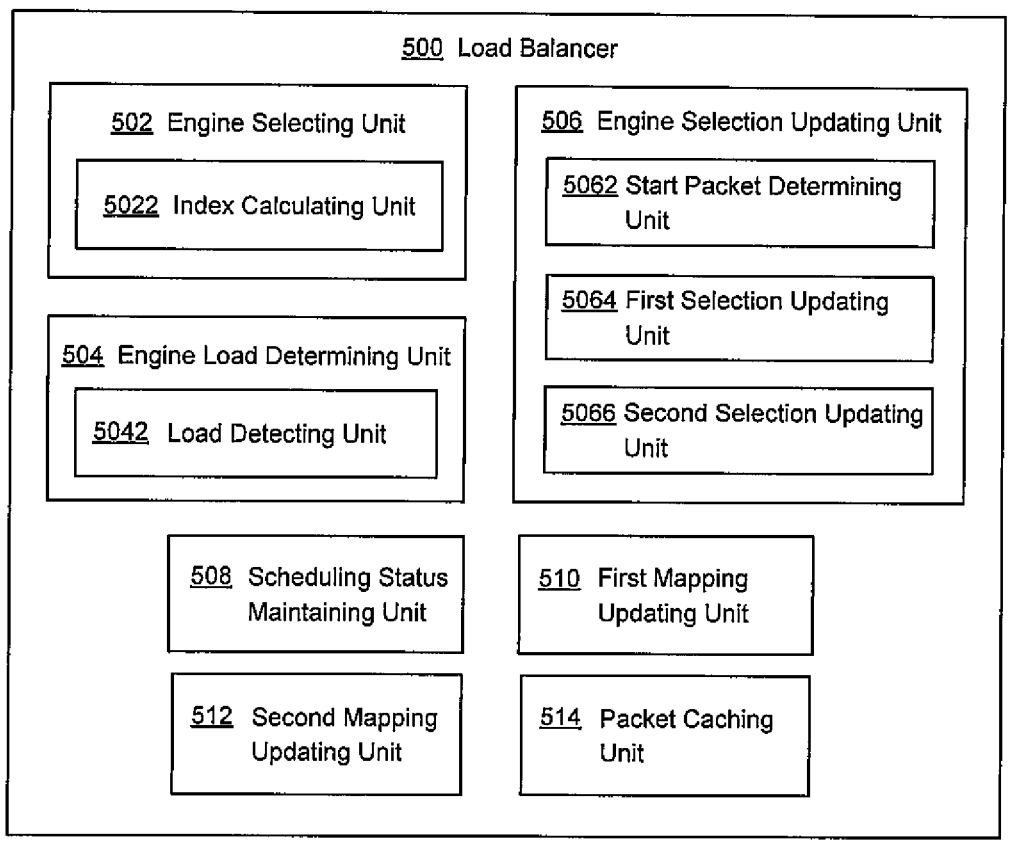
FIG. 5 is a block diagram of a load balancer for use in scheduling a traffic flow in accordance with another exemplary embodiment of the present invention.

FIG. 5 shows a block diagram of a load balancer 500 for use in scheduling a traffic flow in accordance with another exemplary embodiment of the present invention. As shown, the load balancer 500 comprises: engine selecting unit 502, engine load determining unit 504, and engine selection updating unit 506, which corresponds to component 402, 404, and 406 of the load balancer 400, respectively.

In embodiments of the load balancer 500, the engine selection updating unit 506 may further comprises: start packet determining unit 5062, configured to determine whether the packet is a start packet of the traffic flow; first selection updating unit 5064, configured to select a second PE that is different from the first PE from the plurality of PEs as the target PE in response to determining that the packet is the start packet of the traffic flow. In some embodiments, the first selection updating unit 5064 is configured to select the second PE based on loads of the plurality of PEs.

Additionally, the engine selection updating unit 506 may further comprises: start packet determining unit 5062, configured to determine whether the packet is a start packet of the traffic flow; and second selection updating unit 5066, configured to determine, based on the scheduling status, whether the traffic flow is associated with a second PE that is different from the first PE in response to determining that the packet is not the start packet of the traffic flow, and to select the second PE as the target PE in response to determining that the traffic flow is associated with the second PE.

In some embodiments, the load balancer 500 may further comprises scheduling status maintaining unit 508, configured to create the scheduling status to associate the traffic flow with the second PE.

In addition, in some embodiments, the engine selecting unit 502 may comprise index calculating unit 5022 configured to calculate an index which is unique to the traffic flow for retrieving the mapping entry. Preferably, the index calculating unit 5022 may be configured to calculate the index based on a hash value from information of the packet, the information including at least a source address, a destination address, a protocol, a source port, and a destination port of the packet.

The load balancer 500 may further comprise first mapping updating unit 510, configured to update the mapping entry with the updated target PE upon escape of a predefined period of time. In alternative embodiments, the mapping entry is associated with a counter indicating number of flows that are indexed to the mapping entry. In these embodiments, the load balancer 500 may further comprise second mapping updating unit 512, configured to update the mapping entry with the updated target PE in response to determining that value of the counter is zero.

In some embodiments, the engine load determining unit 504 is configured to determine whether load of the updated target PE exceeds a second threshold. In these embodiments, the load balancer 500 may further comprise packet caching unit 514, configured to cause the packet to be cached in a buffer in response to determining that the load of the updated target PE exceeds the second threshold.

In some embodiments, the engine load determining unit 504 may comprise a load detecting unit 5042, configured to detect whether load of a PE exceeds a threshold by comparing length of a packet queue associated with the PE with at least one length threshold. Alternatively, such comparison may also be performed by a dedicated monitor outside the load balancer 500. In these embodiments, engine load determining unit 504 may be configured to communicate with the monitor and receive the load detection results from the monitor.

It is noted that the units of the load balancers 400 and 500 may be configured to implement respective functionalities as described with reference to FIGS. 2 and 3. Therefore, the features discussed with respect to methods 200 and 300 apply to the corresponding units of the load balancers 400 and 500. It is further noted that the units of the load balancers 400 and 500 may be embodied in hardware, software, firmware, or any combination thereof.

Figure 6:
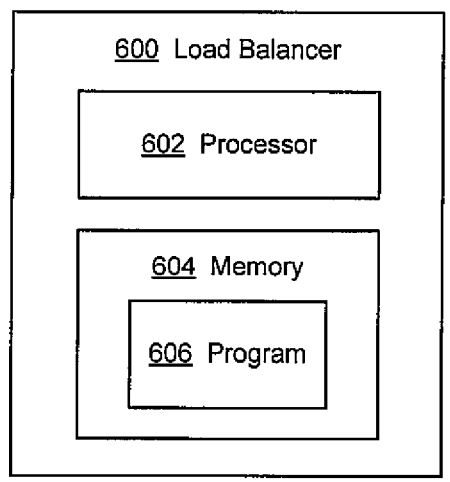
FIG. 6 is a block diagram of a load balancer for use in scheduling a traffic flow in accordance with yet another exemplary embodiment of the present invention.

Now referring to FIG. 6, a block diagram of a load balancer 600 for use in scheduling a traffic flow in accordance with yet another exemplary embodiment of the present invention is shown. As shown, the load balancer 600 comprises at least one processor 602. The processors suitable for use with embodiments of the present invention may include, by way of example, both general and special purpose processors already known or developed in the future. The load balancer 600 further comprises at least one memory 604. The memory 604 may include, for example, semiconductor memory devices, e.g., RAM, ROM, EPROM, EEPROM, and flash memory devices. The memory 604 may be used to store program of computer executable instructions 606. The program 606 can be written in any high-level and/or low-level compliable or interpretable programming languages. In accordance with embodiments, the computer executable instructions may be configured, with the at least one processor, to cause the load balancer 600 to at least perform according to methods 200 and 300 as discussed above.

Figure 7:
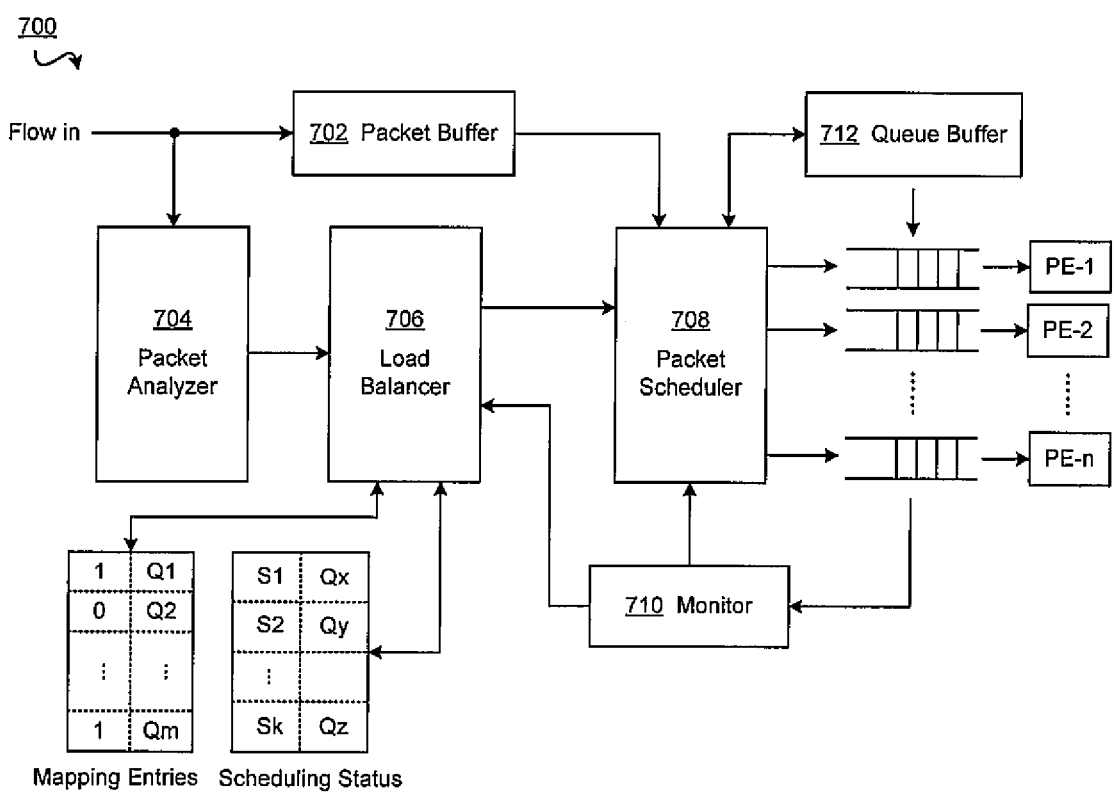
FIG. 7 is a block diagram of a system for balancing loads and scheduling traffic flows in accordance with an exemplary embodiment of the present invention.

Referring now to FIG. 7, a block diagram of a system 700 for balancing loads and scheduling traffic flows in accordance with an exemplary embodiment of the present invention is shown. The method and apparatus in accordance with embodiments of the present invention will be illustratively described with reference to the system 700.

As shown in FIG. 7, incoming packets of the traffic flows may be in packet buffer 702 before being dispatched. Meanwhile, the headers of these packets may be inspected by a packet analyzer 704. In accordance with embodiments of the present invention, the packet analyzer 704 may be configured to extract information from the headers of the packets, such as the source address, destination address, protocol, source port, and destination port of the packet, and any flag that can be used to indicate whether the packet is a start packet of a traffic flow.

The information extracted by the packet analyzer 704 may be passed to a load balancer 706. In accordance with embodiments of the present invention, the load balancer 706 may be implemented as the load balancer 400, 500, or 600. Then, based on the information provided by the packet analyzer 704 and based on the mapping entries (e.g., a PE distribution table) and the scheduling statuses of redirected traffic flows (e.g., a redirected flow table), the load balancer 706 may operate as described above, in order to select a target PE for each incoming packet.

Specifically, as described above, the selection of target PE by the load balancer 706 relies on the dynamic loads of each PEs. To this end, as shown in FIG. 7, a monitor 710 is provided to determine whether a PE is busy and to communicate the determined result to the load balancer 706 and/or packet scheduler 708. The determination of the monitor 710 may be done by, for example, comparing the length of at least one packet queue associated with each PE with at least one predefined threshold. In the example shown in FIG. 7, the monitor 710 is separated from the load balancer 706. Alternatively, the monitor 710 may also be co-located with the load balancer. In this case, the determination and comparison are performed at the load balancer 706.

The selection result by the load balancer 706 may be then passed to the packet scheduler 708, which may be configured to fetch packets from the packet buffer 702, and to dispatch the packets to their respective target PEs (or to the packet queues associated with the respective target PEs).

In some optional embodiments, as described above, there may be provided one or more queue buffers 712 to deal with the situation where the packet has to be dispatched to an already busy PE. In such embodiments, after fetching the relative packet from the packet buffer 702, the packet scheduler 708 may store the packet into the queue buffers 712 if the target PE selected by the load balancer 706 is determined to be busy. When the target PE is not heavily loaded after a while, the packet scheduler 708 may instruct the queue buffer 712 to place the packets into corresponding queues. In alternative embodiments, the packet scheduler 708 may fetch the packets from the queue buffer 712, and then dispatch the packets to their respective target PEs.

It is noted that the packet buffer 702, packet analyzer 704, packet scheduler 708, monitor 710, and/or queue buffer 712 may be implemented by any suitable technique either known at present or developed in the future. Further, a single device shown in FIG. 7 may be alternatively implemented in multiple devices separately, and multiple separated devices may be implemented in a single device. The scope of the present invention is not limited in these regards.

For the purpose of illustrating spirit and principle of the present invention, some specific embodiments thereof have been described above. It will be appreciated by a person skilled in the art that embodiments of the present invention may provide an adaptive load balancing solution by use of the combination of mapping based packet dispatching and dynamic recording of flow-specific scheduling status. The target PE for an incoming packet is initially selected according to mapping entries (e.g., as a PE distribution table). By monitoring the workload or capacity of each PE, once a given PE is found to be busy, the successive flows initially assigned to the given PE may be redirected to another PE, based on the flow-specific scheduling status (e.g., implemented by a redirected flow table). As a result, the load balancing may be accomplished with the flow integrity preserved while taking the capacity of each PE into consideration.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flowcharts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The various blocks shown in FIGS. 2 and 3 may be viewed as method steps, and/or as operations that result from operation of computer program code, and/or as a plurality of coupled logic circuit elements constructed to carry out the associated function(s). At least some aspects of the exemplary embodiments of the inventions may be practiced in various components such as integrated circuit chips and modules, and that the exemplary embodiments of this invention may be realized in an apparatus that is embodied as an integrated circuit, FPGA or ASIC that is configurable to operate in accordance with the exemplary embodiments of the present invention.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Various modifications, adaptations to the foregoing exemplary embodiments of this invention may become apparent to those skilled in the relevant arts in view of the foregoing description, when read in conjunction with the accompanying drawings. Any and all modifications will still fall within the scope of the non-limiting and exemplary embodiments of this invention. Furthermore, other embodiments of the inventions set forth herein will come to mind to one skilled in the art to which these embodiments of the invention pertain having the benefit of the teachings presented in the foregoing descriptions and the associated drawings.

Therefore, it is to be understood that the embodiments of the invention are not to be limited to the specific embodiments disclosed and that modifications and other embodiments are intended to be included within the scope of the appended claims. Although specific terms are used herein, they are used in a generic and descriptive sense only and not for purposes of limitation.

What is claimed is:

1. A method of load balancing for use in scheduling a traffic flow, comprising:
    selecting, based on a mapping entry, a first processing engine (PE) from a plurality of PEs as a target PE for a packet of the traffic flow, the mapping entry indicating an association between the packet and the first PE;
    determining whether load of the target PE exceeds a first threshold; and
    in response to determining that the first threshold is exceeded, updating the selection of the target PE based on a scheduling status of the traffic flow, the scheduling status indicating a dispatch of a previous packet of the traffic flow, such that the packet is dispatched to the same target PE as the previous packet.

2. The method of claim 1, wherein updating the selection of the target PE based on the scheduling status of the traffic flow comprises:
    determining whether the packet is a start packet of the traffic flow; and
    in response to determining that the packet is the start packet of the traffic flow, selecting a second PE that is different from the first PE from the plurality of PEs as the target PE.

3. The method of claim 2, further comprising:
    creating the scheduling status to associate the traffic flow with the second PE.

4. The method of claim 2, wherein the second PE is selected based on loads of the plurality of PEs.

5. The method of claim 1, wherein updating the selection of the target PE based on the scheduling status of the traffic flow comprises:
    determining whether the packet is a start packet of the traffic flow;
    in response to determining that the packet is not the start packet of the traffic flow, determining, based on the scheduling status, whether the traffic flow is associated with a second PE that is different from the first PE; and
    in response to determining that the traffic flow is associated with the second PE, selecting the second PE as the target PE.

6. The method of claim 1, wherein the mapping entry is retrieved by using an index that is unique to the traffic flow.

7. The method of claim 6, wherein the index is based on a hash value derived from information of the packet, the information including at least a source address, a destination address, a protocol, a source port, and a destination port of the packet.

8. The method of claim 1, further comprising:
  determining whether load of the updated target PE exceeds a second threshold; and
  in response to determining that the load of the updated target PE exceeds the second threshold, causing the packet to be cached in a buffer.

9. A load balancer for use in scheduling a traffic flow, comprising:
  at least one processor; and
  at least one memory coupled to the at least one processor, the at least one memory storing computer executable instructions, including:
    an engine selecting unit, configured to select a first processing engine (PE) from a plurality of PEs as a target PE for a packet of the traffic flow based on a mapping entry, the mapping entry indicating an association between the packet and the first PE,
    an engine load determining unit, configured to determine whether load of the target PE exceeds a first threshold, and
    an engine selection updating unit, configured to update the selection of the target PE based on a scheduling status of the traffic flow in response to determining that the first threshold is exceeded, the scheduling status indicating a dispatch of a previous packet of the traffic flow, such that the packet is dispatched to the same target PE as the previous packet.

10. The load balancer of claim 9, wherein the engine selection updating unit comprises:
  a start packet determining unit, configured to determine whether the packet is a start packet of the traffic flow; and
  a first selection updating unit, configured to select a second PE that is different from the first PE from the plurality of PEs as the target PE in response to determining that the packet is the start packet of the traffic flow.

11. The load balancer of claim 10, wherein the computer executable instructions further comprise:
  a scheduling status maintaining unit, configured to create the scheduling status to associate the traffic flow with the second PE.

12. The load balancer of claim 10, wherein the first selection updating unit is configured to select the second PE based on loads of the plurality of PEs.

13. The load balancer of claim 9, wherein the engine selection updating unit comprises:
  a start packet determining unit, configured to determine whether the packet is a start packet of the traffic flow; and
  a second selection updating unit, configured to
    determine, based on the scheduling status, whether the traffic flow is associated with a second PE that is different from the first PE in response to determining that the packet is not the start packet of the traffic flow; and
    select the second PE as the target PE in response to determining that the traffic flow is associated with the second PE.

14. The load balancer of claim 9, wherein the engine selecting unit comprises index calculating unit configured to calculate an index that is unique to the traffic flow for retrieving the mapping entry.

15. The load balancer of claim 14, wherein the index calculating unit is configured to calculate the index based on a hash value from information of the packet, the information including at least a source address, a destination address, a protocol, a source port, and a destination port of the packet.

16. The load balancer of claim 9, wherein the engine load determining unit is configured to determine whether load of the updated target PE exceeds a second threshold, the load balancer further comprising:
  packet caching unit, configured to cause the packet to be cached in a buffer in response to determining that the load of the updated target PE exceeds the second threshold.

17. A load balancer for use in scheduling a traffic flow, comprising:
  at least one processor; and
  at least one memory storing program of computer executable instructions;
  the computer executable instructions configured, with the at least one processor, to cause the load balancer to at least perform operations comprising:
    selecting, based on a mapping entry, a first processing engine (PE) from a plurality of PEs as a target PE for a packet of the traffic flow, the mapping entry indicating an association between the packet and the first PE;
    determining whether load of the target PE exceeds a first threshold; and
    in response to determining that the first threshold is exceeded, updating the selection of the target PE based on a scheduling status of the traffic flow, the scheduling status indicating a dispatch of a previous packet of the traffic flow, such that the packet is dispatched to the same target PE as the previous packet.

18. The load balancer of claim 17, wherein updating the selection of the target PE based on the scheduling status of the traffic flow comprises:
  determining whether the packet is a start packet of the traffic flow; and
  in response to determining that the packet is the start packet of the traffic flow, selecting a second PE that is different from the first PE from the plurality of PEs as the target PE.

19. The load balancer of claim 18, wherein the operations further comprising:
  creating the scheduling status to associate the traffic flow with the second PE.

20. The load balancer of claim 18, wherein the second PE is selected based on loads of the plurality of PEs.

* * * * *